United States Patent
Shi et al.

(10) Patent No.: US 11,775,070 B2
(45) Date of Patent: Oct. 3, 2023

(54) VIBRATION CONTROL METHOD AND SYSTEM FOR COMPUTER DEVICE

(71) Applicant: Shanghai Bilibili Technology Co., Ltd., Shanghai (CN)

(72) Inventors: Yingxuan Shi, Shanghai (CN); Yong Wu, Shanghai (CN); Chaoran Li, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 119 days.

(21) Appl. No.: 17/331,897

(22) Filed: May 27, 2021

(65) Prior Publication Data

US 2021/0373670 A1    Dec. 2, 2021

(30) Foreign Application Priority Data

Jun. 1, 2020   (CN) .......................... 202010486027.1

(51) Int. Cl.
| | |
|---|---|
| *G06F 3/048* | (2013.01) |
| *G06F 3/01* | (2006.01) |
| *G06F 16/17* | (2019.01) |
| *G06N 3/08* | (2023.01) |
| *G11B 27/02* | (2006.01) |

(52) U.S. Cl.
CPC .............. *G06F 3/016* (2013.01); *G06F 16/17* (2019.01); *G06N 3/08* (2013.01); *G11B 27/02* (2013.01)

(58) Field of Classification Search
CPC   G06N 3/08; G11B 27/02; G06F 16/17; G06F 3/016
See application file for complete search history.

(56) References Cited

U.S. PATENT DOCUMENTS

| | | | |
|---|---|---|---|
| 9,728,225 B2 * | 8/2017 | Hsu .................... | G11B 27/031 |
| 10,255,898 B1 * | 4/2019 | Movshovitz-Attias ..................... | G11B 27/034 |
| 11,289,110 B2 * | 3/2022 | Zheng ..................... | G10L 25/48 |
| 2003/0131362 A1 * | 7/2003 | Jasinschi ............. | G06F 16/7834 725/87 |

(Continued)

FOREIGN PATENT DOCUMENTS

| | | | | | |
|---|---|---|---|---|---|
| CN | 107197388 A | * | 9/2017 | ............. | G10L 21/02 |
| CN | 108040181 A | * | 5/2018 | | |

(Continued)

*Primary Examiner* — Rashawn N Tillery
(74) *Attorney, Agent, or Firm* — BakerHostetler (57) ABSTRACT

Techniques for controlling vibrations of a computing device is provided in the present disclosure. The techniques comprise obtaining a target audio file of a multimedia file; dividing the target audio file into a plurality of audio segments; determining a target audio segment among the plurality of audio segments based on detecting at least one feature associated with each of the plurality of audio segments; determining a target time period in a total time period of playing the multimedia file, the target time period corresponding to a playback of the target audio segment in the multimedia file; monitoring a current time point of playing the multimedia file; and controlling a vibration element in the computing device to perform a vibration operation when the current time point of playing the multimedia file is within the target time period.

15 Claims, 5 Drawing Sheets

Determining an audio type of the target audio file — S700

Performing a detection operation on the multiple audio segments and determining the target audio segment based on a predetermined rule corresponding to the audio type — S702

(56) References Cited

U.S. PATENT DOCUMENTS

| | | | | |
|---|---|---|---|---|
| 2007/0265842 A1* | 11/2007 | Jarvinen | ................ | G10L 25/93 |
| | | | | 704/214 |
| 2016/0175718 A1* | 6/2016 | Yoo | ...................... | A63F 13/424 |
| | | | | 463/35 |
| 2020/0272659 A1* | 8/2020 | Pachet | ................... | G06N 20/00 |
| 2022/0047954 A1* | 2/2022 | Shi | ......................... | A63F 13/54 |
| 2022/0165239 A1* | 5/2022 | Wu | ........................ | G10L 25/90 |
| 2022/0193549 A1* | 6/2022 | Wakeland | ............. | A63F 13/428 |

FOREIGN PATENT DOCUMENTS

| | | | | | |
|---|---|---|---|---|---|
| CN | 109451154 A | * | 3/2019 | ............ | G06F 3/016 |
| CN | 109908578 A | * | 6/2019 | | |

\* cited by examiner

VIBRATION CONTROL METHOD AND SYSTEM FOR COMPUTER DEVICE

CROSS-REFERENCE TO RELATED APPLICATION

The present application claims priority of Chinese Patent Application No. 202010486027.1, file on Jun. 1, 2020, entitled "Vibration control method and system for computer device". Entire content of the Chinese patent application is incorporated in the present application by reference.

BACKGROUND

There is more and more interaction between users and computer devices such as tablets and mobile phones, for example, watching movies, videos, or games. With the popularization of concepts such as augmented reality and virtual reality, people are increasingly demanding computer devices for entertainment. However, when current computer devices play video content such as movies and games, output form provided is single, the interactive way is few, resulting in a poor user experience, which has obviously failed to meet people's current entertainment demand.

SUMMARY

The purpose of embodiments of the present application is to provide a vibration control method and system for a computer device, computer device, and computer readable storage medium to solve the following problems: in the prior art, when the computer device plays multimedia files such as movies and games, an output form provided is single, the interactive way is few, and user's experience is poor.

On one aspect of the embodiments of the present application a vibration control method for a computer device is provided, and the method includes obtaining a target audio file of a multimedia file; dividing the target audio file into a plurality of audio segments; determining a target audio segment among the plurality of audio segments based on detecting at least one feature associated with each of the plurality of audio segments; determining a target time period in a total time period of playing the multimedia file, the target time period corresponding to a playback of the target audio segment in the multimedia file; monitoring a current time point of playing the multimedia file; and controlling a vibration element in the computing device to perform a vibration operation when the current time point of playing the multimedia file is within the target time period.

On another aspect of the embodiments of the present application, a computer device is provided, which includes a memory, a processor, and computer programs that stored in the memory and operable on the processor, wherein the computer programs are executed by the processor to implement steps of the vibration control method for computer device described above.

On another aspect of the embodiments of the present application, a computer readable storage medium, which stores computer programs that upon execution by at least one processor causes the at least one processor to implement steps of the vibration control method for computer device described above.

DETAILED DESCRIPTION OF ILLUSTRATIVE EMBODIMENTS

In order to make the purpose, technical solutions, and advantages of the present application clearer, the following further describes the present application in detail with reference to the accompanying drawings and embodiments. It should be understood that the specific embodiments described here are only used to explain the present application, and not used to limit the present application. Based on the embodiments in the present application, all other embodiments obtained by those of ordinary skills in the art without creative work are falling within the protection scope of the present application.

It should be noted that the descriptions related to "first", "second" and so on in the embodiments of the present application are only for descriptive purposes, and cannot be understood as indicating or implying their relative importance or implicitly specifying the indicated technical features quantity. Therefore, the features defined with "first" and "second" may explicitly or implicitly include at least one of the features. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, and is not within the scope of protection required by the present application.

The vibration control method and system for a computer device, computer device, and computer readable storage medium provided in the embodiments of the present application enable the computer device to output audio content, video content, and vibration in the process of playing a multimedia file. That is, in the process of playing the multimedia file, the computer device increases the tactile content output, effectively increases the output form and interactive ways, and improves the interaction with users, so that the user has a more realistic experience.

The computer device 2 may be configured to provide multimedia playing services. The multimedia play services may be configured to receive content via various transmission technologies and play the received contents. The content may include content streams (for example, video streams, audio streams), content files (for example, video files, audio files), and/or other data.

The computer device 2 may be configured to access the contents and services of a provider network 4. The computer device 2 may be a mobile device such as a smart phone, a tablet device, an augmented reality/virtual reality device, a smart watch with a built-in vibration element (such as a vibration motor), and the like.

The computer device 2 may be associated with one or more users. A single user can use the computer device 2 to access the provider network 4. The computer device 2 can travel to various locations and use different networks to access the provider network 4.

The computer device 2 may include an application 2A and other applications. The application 2A outputs (such as displays, renders, and presents) the contents to the user. The application 2A may be a multimedia player (such as a Bilibili client), a browser client, and so on. As an example, as shown in FIG. 1 and FIG. 2, FIG. 1 shows a video screen when the application 2A plays a music video, and FIG. 2 shows the video screen when the application 2A plays a game video.

Figure 1:
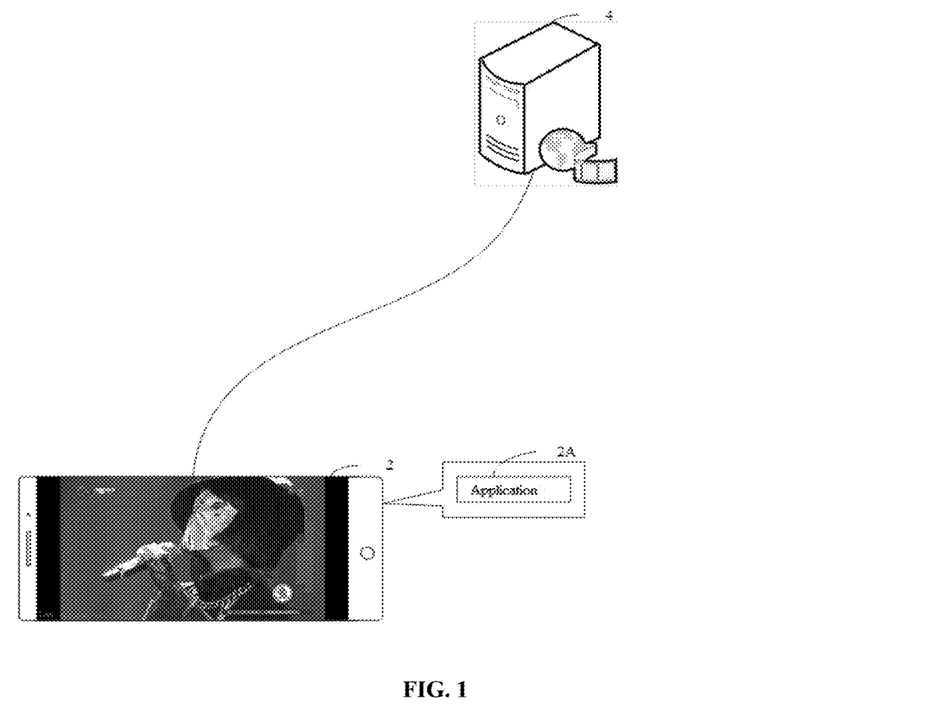
FIG. 1 schematically shows an application environment diagram of a vibration control method for a computer device according to an embodiment of the present application.
Figure 2:
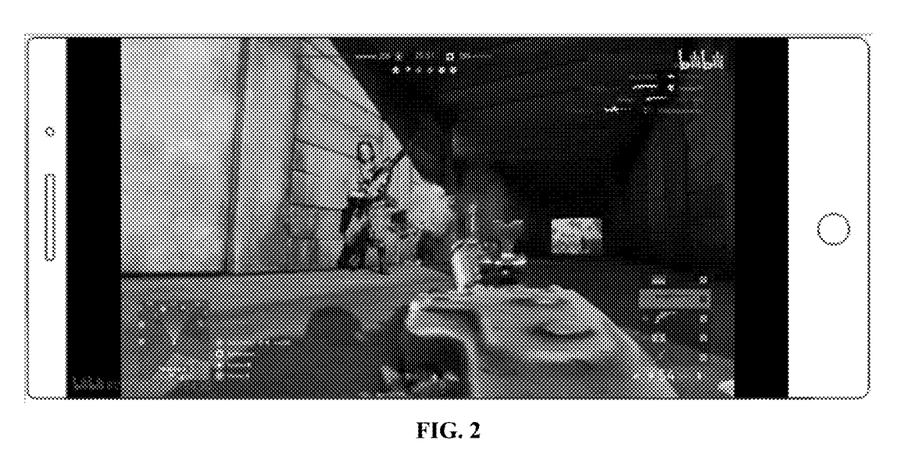
FIG. 2 schematically shows another application environment diagram of a vibration control method for computer device according to an embodiment of the present application.

In video scenes, as shown in FIG. 1 or FIG. 2, the computer device 2 also outputs tactile information in a vibration manner while outputting visual information and auditory information. That is, the present application can enhance the interaction with users by increasing the vibration, so as to achieve a full range of visual, auditory and tactile content output, making the user feel more real. It should be noted that the video scenes shown in FIG. 1 and FIG. 2 are exemplary and are not used to limit the protection scope of the present application.

A First Embodiment

FIG. 2 schematically shows a flowchart of a vibration control method of a computer device according to a first embodiment of the present application. It can be understood that the flowchart in the method embodiment is not used to limit the order of execution of the steps. The following exemplarily describes the computer device 2 as the execution subject.

Figure 3:
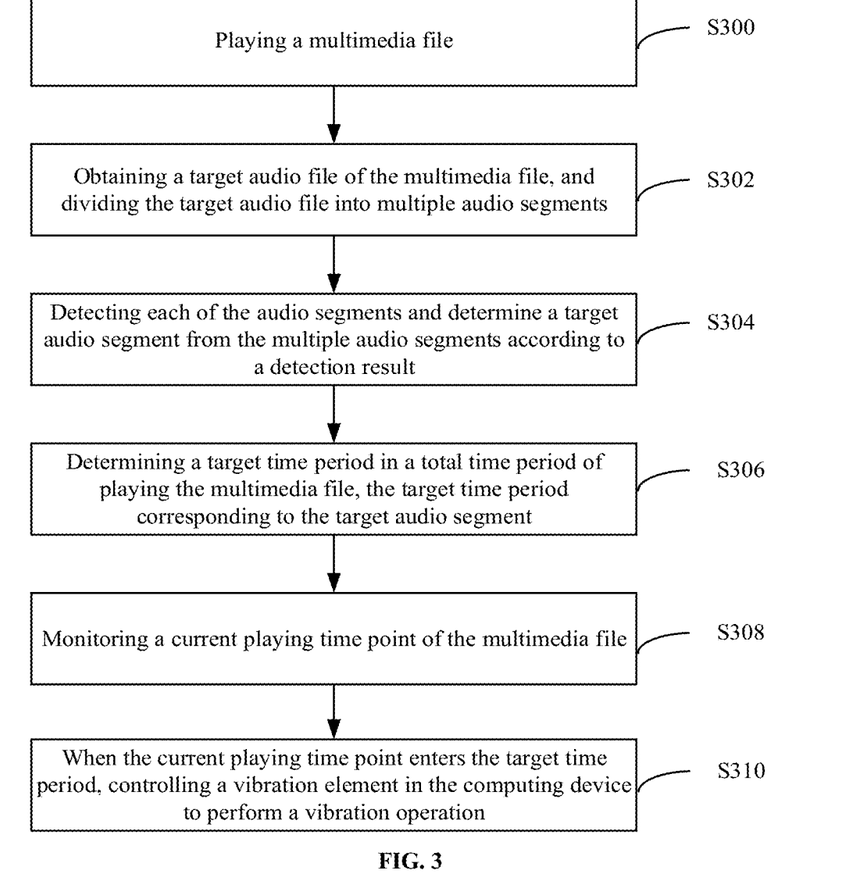
FIG. 3 schematically shows a flowchart of a vibration control method for computer device according to a first embodiment of the present application.

As shown in FIG. 3, the vibration control method of the computer device 2 may include steps S300 to S310, wherein:

Step S300, playing a multimedia file.

The multimedia file refers to an overall file formed by combining audio content, image content, text content, and animation content, and the like. Of course, in other embodiments, the multimedia file may also be an audio-only file.

The multimedia file may be a local file in the computer device 2 or an online file obtained through the Internet.

The multimedia file may include various types of content, for example, music-type audio and video content as shown in FIG. 1, game-type audio and video content as shown in FIG. 2, movie-type audio and video content, or other types of content.

Step S302, obtaining a target audio file of the multimedia file, and dividing the target audio file into multiple audio segments.

In order to prevent a noise signal from interfering with subsequent detection operations to improve detection accuracy, the target audio file should be an audio file without noise signal interference or with noise signal interference within a controlled preset range, or an audio file after removing noise signal.

The computer device 2 can separate an initial audio file from the multimedia file, and perform noise interference detection on the initial audio file. When the initial audio file is the audio file without noise signal interference or with noise signal interference within the controlled preset range, the computer device 2 uses the initial audio file as the target audio file. When the initial audio file is the audio file with excessive noise signal interference, the computer device 2 needs to preprocess the initial audio file to remove noise signal in the initial audio file.

Figure 4:
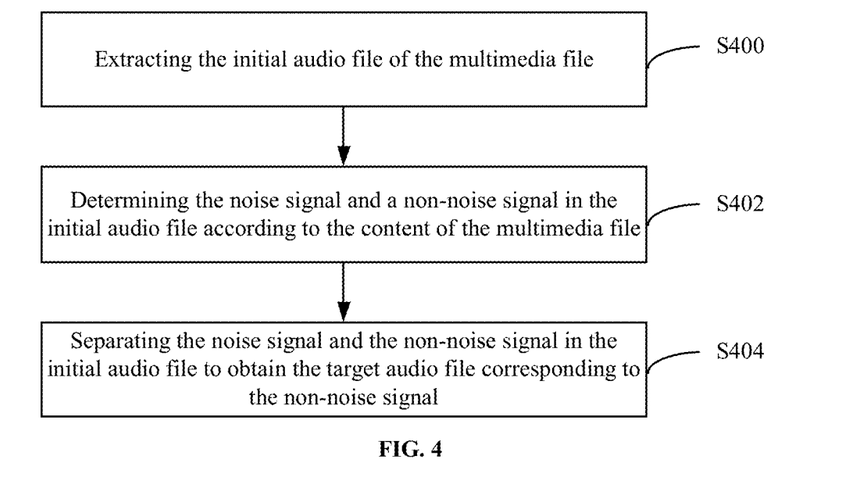
FIG. 4 schematically shows a sub-step of step S302 in FIG. 3.

Which signal in the initial audio file can be considered as the noise signal is determined according to content of the multimedia file. As shown in FIG. 1, when the content of the multimedia file is music-type audio and video content, a voice signal in the initial audio file may be considered as the noise signal causing interference. As shown in FIG. 4, step S302 may include steps S400 to S404, wherein: S400, extracting the initial audio file of the multimedia file; S402, determining the noise signal and a non-noise signal in the initial audio file according to the content of the multimedia file; and S404, separating the noise signal and the non-noise signal in the initial audio file to obtain the target audio file corresponding to the non-noise signal. In some embodiments, the computer device 2 can separate the noise signal and the non-noise signal in the initial audio file through a trained deep neural network model, a hidden Markov model and so on. In other embodiments, the computer device 2 may also implement the separation operation in step S402 in other ways, such as time domain analysis or frequency domain analysis.

Exemplarily, in step S402, the computer device 2 may obtain or determine the content of the multimedia file according to the classification, introduction, and comment keywords of the multimedia file. Herein, the content of the multimedia file includes but is not limited to a music type, a commentary type, and so on. The content of the multimedia file is different, and the determined noise signal and the non-noise signal in the initial audio file are also different. For example, when the content of the multimedia file is music-like audio and video content, when the content of the multimedia file is music-type audio and video content, a voice signal in the initial audio file is determined to be the noise signal and a non-voice signal in the initial audio file is determined to be the non-noise signal; when the content in the multimedia file is the commentary type, the non-voice signal in the initial audio file is determined to be the noise signal and the voice signal in the initial audio file is determined to be the non-noise signal.

Figure 5:
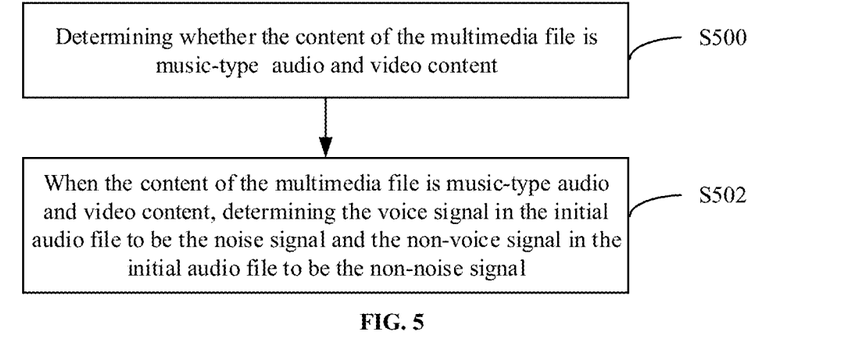
FIG. 5 schematically shows a sub-step of step S402 in FIG. 4.

As an example, in some situations, the voice signal in the initial audio file may be regarded as the noise signal causing interference. As shown in FIG. 5, step S402 may include steps S500 to S502, wherein: step S500, determining whether the content of the multimedia file is music-type audio and video content; step S502, when the content of the multimedia file is music-type audio and video content, determining the voice signal in the initial audio file to be the noise signal and the non-voice signal in the initial audio file to be the non-noise signal. The advantage is that the human voice interference in music-type audio and video content can be eliminated, so as to improve the accuracy of subsequent drum detection.

Step S304, detecting each of the audio segments and determining a target audio segment from the multiple audio segments according to a detection result.

Exemplarily, each of the audio segments may be 10 milliseconds.

Exemplarily, the target audio segment should have special features to distinguish from other audio segments in the multiple audio segments. The target audio segment among the plurality of audio segments is determined based on detecting at least one feature associated with each of the plurality of audio segments. For example, compared to other audio segments in the multiple audio segments, the target audio segment can more arouse user's experience.

Figure 6:
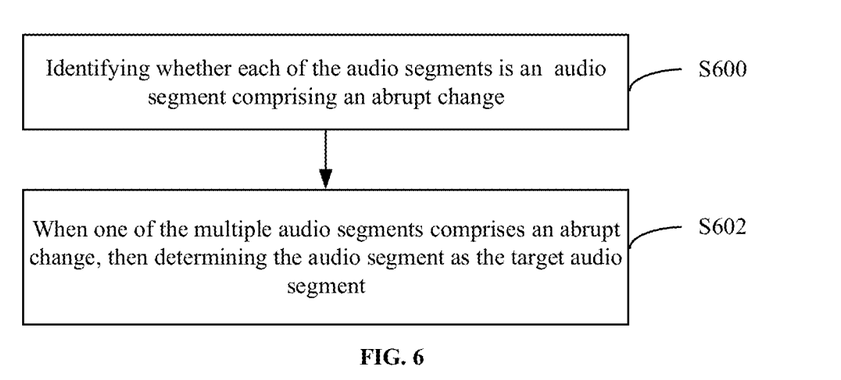
FIG. 6 schematically shows a sub-step of step S304 in FIG. 3.

In the exemplary embodiment, in order to quickly and accurately obtain the target audio segment from the multiple audio segments, as shown in FIG. 6, step S304 may include steps S600 to S602, wherein: S600, identifying whether each of the audio segments is an audio segment comprising an abrupt change; S602, when one of the multiple audio segments is the audio segment comprising the abrupt change, then determining the audio segment as the target audio segment. In some embodiments, the computer device 2 can recognize whether each of the audio segments is the audio segment comprising an abrupt change through the trained deep neural network model, hidden Markov model, and so on. In other embodiments, the computer device 2 may also implement the identification operation in step S500 S600 in other ways, such as time domain analysis or frequency domain analysis.

Wherein, the model recognition is to identify the audio segment comprising an abrupt change through audio features of each of the audio segments (such as Mel cepstrum coefficient (MFCC), fundamental frequency, and so on). The time domain analysis is to find the audio segment comprising an abrupt change by calculating energy accumulation of a waveform file. The frequency domain analysis is to find the audio segment comprising an abrupt change by calculating spectral energy change.

The audio segment comprising an abrupt change has at least one of the following features:

First, an energy change range exceeding a first threshold. The energy change range may refer to the energy change range inside the audio segment, or the energy change range between the audio segment and an adjacent previous audio segment. In some embodiments, the energy change range may be understood as an energy increase range.

Second, a pitch change range exceeding a second threshold. The pitch change range may refer to the pitch change range inside the audio segment, or the pitch change range between the audio segment and the adjacent previous audio segment. In some embodiments, the pitch change range can be understood as a pitch increase range.

Third, a timbre change range exceeding a third threshold. The timbre change range may refer to the timbre change range inside the audio segment, or the timbre change range between the audio segment and the adjacent previous audio segment. In some embodiments, the timbre change range can be understood as a timbre increase range.

The above steps S600 to S602 provide a first obtaining way of the target audio segment. The following provides a second obtaining way.

As mentioned above, the multimedia file may include various types of content, such as music-type audio and video content, game-type audio and video content, movie-type audio and video content, or other types of content. Different types of content have different perceptions of the user. For example, for the music-type audio and video content, the user focuses on rhythm; for the game-type audio and video content, the user focuses on threatening sounds such as gunshots.

Figure 7:
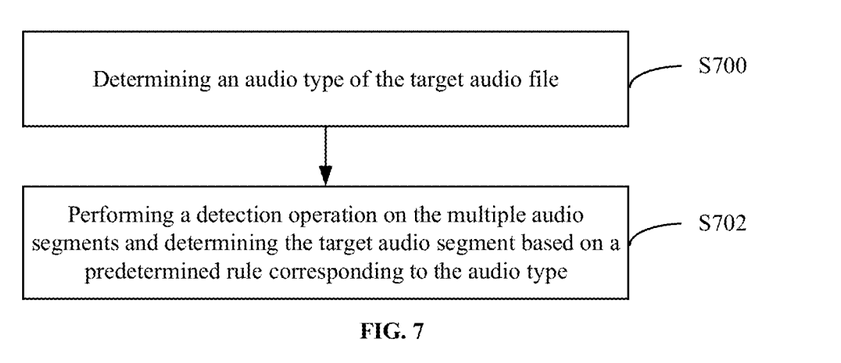
FIG. 7 schematically shows another sub-step of step S304 in FIG. 3.

In the exemplary embodiment, in order to quickly and accurately obtain the target audio segment that meets the user's focus (or stimulation point) from the multiple audio segments, as shown in FIG. 7, step S304 may include steps S700 to S702, wherein: S700, determining an audio type of the target audio file; S702, performing a detection operation on the multiple audio segments and determining the target audio segment based on a predetermined rule corresponding to the audio type. For example, when the audio type is a music audio type, and the target audio segment is an audio segment with a musical drum; when the audio type is a game audio type, and the target audio segment is an audio segment with a gunshot sound point.

The following provides a third obtaining way.

Figure 8:
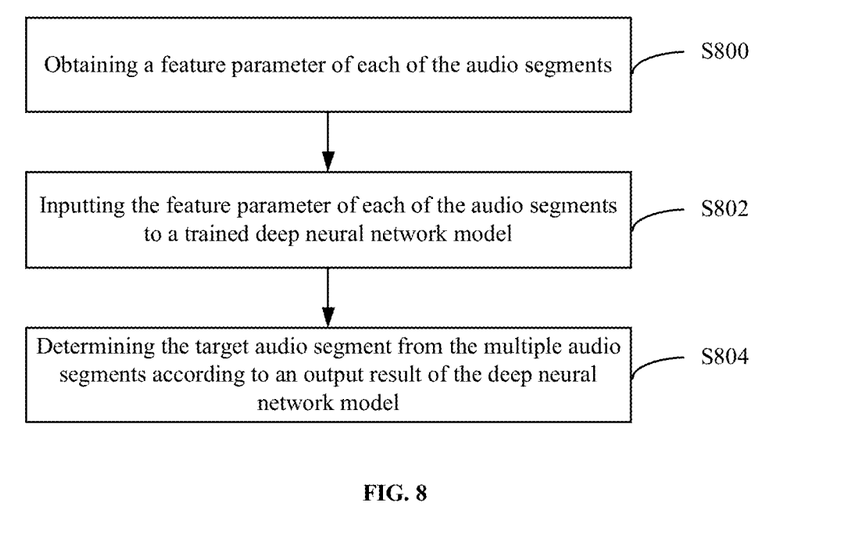
FIG. 8 schematically shows another sub-step of step S304 in FIG. 3.

In the exemplary embodiment, in order to quickly and accurately obtain the target audio segment from the multiple audio segments, as shown in FIG. 8, step S304 may include steps S800 to S804, wherein: S800, obtaining a feature parameter of each of the audio segments; S802, inputting the feature parameter of each of the audio segments to a trained deep neural network model; and S804, determining the target audio segment from the multiple audio segments according to an output result of the deep neural network model. In some embodiments, the initial deep neural network model can be trained through a large amount of music-type audio content to obtain the deep neural network model for finding musical drums. In other embodiments, the initial deep neural network model can be trained through a large amount of game-type audio content to obtain the deep neural network model for finding gunshots or other special sounds. In other embodiments, the initial deep neural network model may be trained through a large amount of various types of audio contents to obtain the deep neural network model for finding various mutational points.

Step S306, determining a target time period in a total time period of playing the multimedia file, the target time period corresponding to a playback of the target audio segment in the multimedia file.

For example, the total playing time of the audio file is 30 seconds, the audio file is divided into 3000 audio segments, and the time length of each audio segment is 10 milliseconds. Therefore, the first audio segment is the 0th to 9th milliseconds, the second audio segment is 10th to 19th milliseconds, the third audio segment is 20th to 29th milliseconds, . . . , the 300th audio segment is 29990th to 29999th milliseconds. For example, when the third audio segment in the audio file is the target audio segment, the 20th to 29th milliseconds can be determined to be the target time period based on the target audio segment.

Step S308, monitoring a current playing time point of the multimedia file.

The current playing time point is a playing time point corresponding to the multimedia content (video frame) currently being played. The playing time point is a relative position point in the total playing time period. The current playing time point corresponds to a current position point in the playing progress bar displayed by the application 2A when the multimedia content is played.

Step S310, controlling a vibration element in the computer device to perform a first type of vibration operation when the current playing time point enters the target time period.

The first type of vibration operation may be a pulse vibration operation.

As an example, the content of the multimedia file is game-type audio and video content, and the target audio segment is the audio segment with gunshot sound points. The computer device 2 simultaneously outputs a gunshot picture and a gunshot sound and performs the pulse vibration operation in the target audio segment when playing the target audio segment of the multimedia file. That is, when the computer device 2 also outputs tactile information in a vibration manner when outputting visual information and auditory information, which realizes a full range of content output in visual, auditory, and tactile, effectively improving user's experience.

Figure 9:
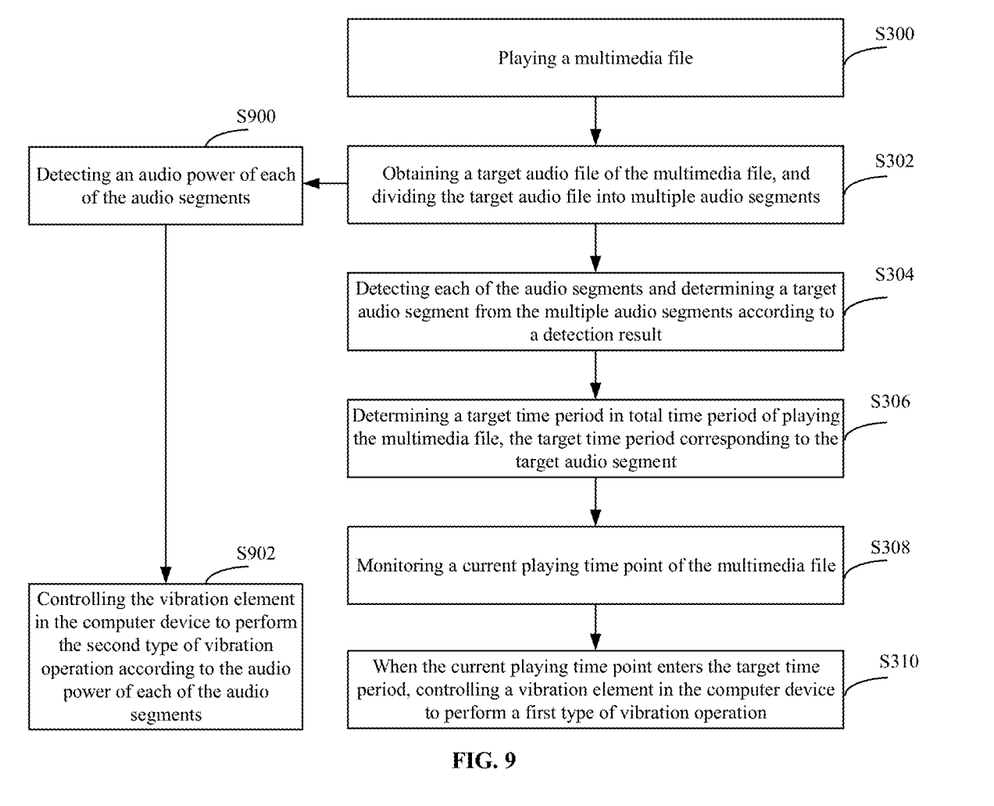
FIG. 9 schematically shows another flowchart of a vibration control method for a computer device according to a first embodiment of the present application.

In the exemplary embodiment, the computer device 2 may also perform a second type of vibration operation to further enhance the interaction with the user and enhance the user's experience. As shown in FIG. 9, the method may further include steps S900 to S902, wherein: S900, detecting an audio power of each of the audio segments; S902, controlling the vibration element in the computer device to perform the second type of vibration operation according to the audio power of each of the audio segments. The first type of vibration operation may be a continuous vibration operation. The amplitude of the continuous vibration operation varies with the audio power of each of the audio segments. In the embodiment, in the process of playing the multimedia file, the computer device 2 controls the vibration element to perform the vibration operation through a pulse vibration signal and a continuous vibration signal, thereby enhancing the vibration experience.

The vibration control method for the computer device provided in the embodiments of the present application enables the computer device to automatically detect each audio segment in the multimedia file in the process of playing the multimedia file, and determine whether each audio segment meets the conditions for performing the first type of vibration operation according to the audio features of each audio segment (such as energy change, pitch change, and so on). The audio segment that meets the first type of vibration condition is determined as the target audio segment, and the first type of vibration operation is performed when the multimedia file is played to the target time period corresponding to the target audio segment. In other words, the embodiments of the present application can still output visual information and auditory information while the multimedia file itself does not provide any vibration information, and can also output tactile information in a specific time period (such as the target time period) in a vibration manner, improving user's experience and having a wide range of applications. The embodiment of the present application realizes the full range of content output in visual, auditory and tactile by increasing vibration, which effectively increases the output form and interaction mode and enhances the interaction with the user, so that the user has a more realistic experience.

A Second Embodiment

Figure 10:
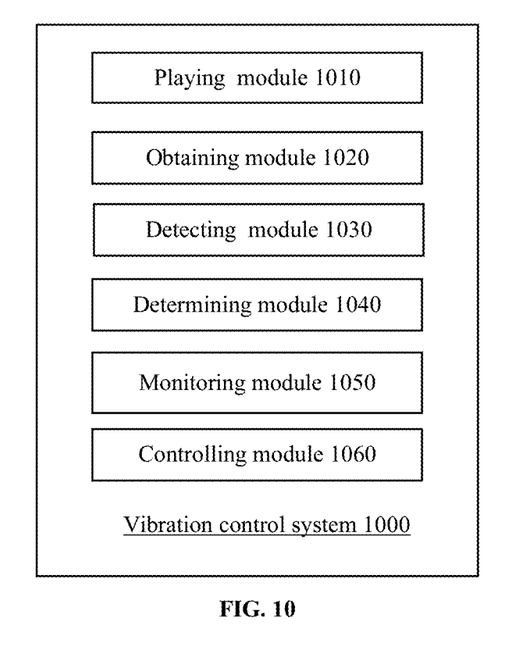
FIG. 10 schematically shows a block diagram of a vibration control system for a computer device according to a second embodiment of the present application.

FIG. 10 schematically shows a block diagram of a vibration control system for a computer device according to a second embodiment of the present application, the vibration control system for computer device may be divided into one or more program modules, and the one or more program modules are stored in a storage medium and executed by one or more processors to complete the embodiment of the present application. The program modules referred to in the embodiment of the present application refer to a series of computer program instruction segments capable of completing specific functions. The following description will specifically introduce the function of each program module in the embodiment.

As shown in FIG. 10, the vibration control system for computer device 1000 may include a playing module 1010, an obtaining module 1020, a detecting module 1030, a determining module 1040, a monitoring module 1050, and a controlling module 1060, wherein:

The playing module 1010, playing a multimedia file.

The obtaining module 1020, obtaining a target audio file of the multimedia file, and dividing the target audio file into multiple audio segments.

The detecting module 1030, detecting each of the audio segments to obtain a target audio segment from the multiple audio segments according to a detection result.

The determining module 1040, determining a target time period in a total playing time period of the multimedia file according to the target audio segment.

The monitoring module 1050, monitoring a current playing time point of the multimedia file.

The controlling module 1060, controlling a vibration element in the computer device to perform a first type of vibration operation when the current playing time point enters the target time period.

In an exemplary embodiment, the obtaining module 1020, is further for: extracting an initial audio file of the multimedia file; determining a noise signal and a non-noise signal in the initial audio file according to content of the multimedia file; and separating the noise signal and the non-noise signal in the initial audio file to obtain the target audio file corresponding to the non-noise signal.

In the exemplary embodiment, the obtaining module 1020, is further for: determining whether the content of the multimedia file is music-type audio and video content; and when the content of the multimedia file is music-type audio and video content, determining a voice signal in the initial audio file to be the noise signal and a non-voice signal in the initial audio file to be the non-noise signal.

In the exemplary embodiment, the obtaining module 1020, is further for: extracting the initial audio file of the multimedia file; and separating a voice signal and a non-voice signal in the initial audio file to obtain the target audio file corresponding to the non-voice signal.

In the exemplary embodiment, the detecting module 1030, is further for: identifying whether each of the audio segments is an audio segment comprising an abrupt change; and when one of the multiple audio segments is the audio segment comprising an abrupt change, then determining the audio segment as the target audio segment.

In the exemplary embodiment, the mutational audio segment includes at least one of following features: an energy change range exceeding a first threshold; a pitch change range exceeding a second threshold; or a timbre change range exceeding a third threshold.

In the exemplary embodiment, the detecting module 1030, is further for: determining an audio type of the target audio file; and performing a detection operation on the multiple audio segments to obtain the target audio segment associated with the audio type.

In the exemplary embodiment, the audio type is a music audio type, and the target audio segment is an audio segment with a musical drum.

In the exemplary embodiment, the audio type is a game audio type, and the target audio segment is an audio segment with a gunshot sound point.

In the exemplary embodiment, the detecting module 1030, is further for: obtaining a feature parameter of each of the audio segments; inputting the feature parameter of each of the audio segments to a trained deep neural network model; and determining the target audio segment from the multiple audio segments according to an output result of the deep neural network model.

In the exemplary embodiment, the controlling module 1060, is further for: detecting an audio power of each of the audio segments; and controlling the vibration element in the computer device to perform a second type of vibration operation according to the audio power of each of the audio segments.

A Third Embodiment

Figure 11:
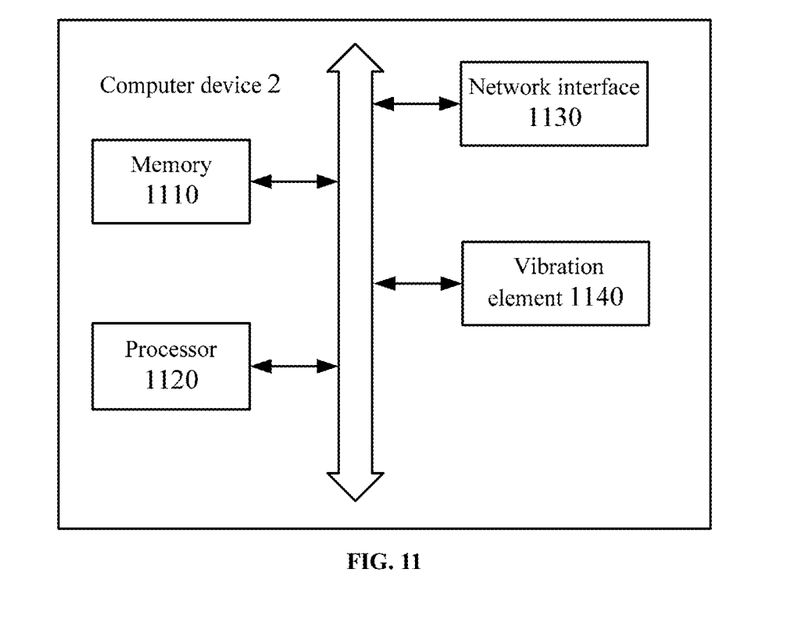
FIG. 11 schematically shows a schematic diagram of a hardware architecture of a computer device suitable for implementing a vibration control method for a computer device according to a third embodiment of the present application.

FIG. 11 schematically shows a schematic diagram of a hardware architecture of a computer device suitable for implementing a vibration control method for the computer device according to a third embodiment of the present application. In the embodiment, the computer device 2 is a device capable of automatically performing numerical calculations and/or information processing according to pre-defined or stored instructions, such as can be a smart phone, a tablet, a laptop, a desktop computer, a rack server, a blade server, a tower server or a rack server (including independent servers, or server clusters composed of multiple servers), etc. As shown in FIG. 11, the computer device 2 includes, but is not limited to, a memory 1110, a processor 1120, a network interface 1130, and a vibration element 1140 that can be communicated with each other through a system bus. Wherein:

The memory 1110 includes at least one type of computer readable storage medium. The readable storage medium includes flash memory, hard disk, multimedia card, card type memory (such as SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical dis and so on. In some embodiments, the memory 1110 may be an internal storage module of the computer device 2 such as a hard disk or memory of the computer device 2. In other embodiments, the memory 1110 may also be an external storage device of the computer device 2, such as a plugged hard disk provided in the computer device 2, a smart media card (SMC), secure digital (SD) card, a flash memory card, and so on. Of course, the memory 1110 may also include both an internal storage module and an external storage device of the computer device 2. In the embodiment, the memory 1110 is generally used to store an operating system and various types of application software installed in the computer device 2 such as program codes of the vibration control method for computer device and the like. In addition, the memory 1110 may also be used to temporarily store various types of data that have been or will be outputted.

The processor 1120, in some embodiments, may be a central processing unit (CPU), a controller, a microprocessor, or other data processing chip. The processor 1120 is generally used to control the overall operation of the computer device 2 such as performing control and processing related to data interaction or communication with the computer device 2. In the embodiment, the processor 1120 is used to run program code stored in the memory 1110 or process data.

The network interface 1130 may include a wireless network interface or a wired network interface which is generally used to establish a communication connection between the computer device 2 and other computer devices. For example, the network interface 1130 is used for connecting the computer device 2 to an external terminal via a network and establishing a data transmission channel and a communication connection between the computer device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and so on.

The vibration element 1140 may include a vibration motor for providing a vibration function.

It is to be noted that FIG. 11 shows only the computer device 2 having components 1110-1140, but it is understood that it is not required to implement all of the shown components and that more or fewer parts can be implemented in lieu thereof.

In the embodiment, a vibration control method for a computer device stored in the memory 1110 may be divided into one or more program modules and executed by one or more processors (processor 1120 in the embodiment) to complete the embodiment of the present application.

A Fourth Embodiment

The present application further provides a computer readable storage medium, which stores computer programs, and when the computer programs are executed by a processor to realize the steps of a vibration control method for computer device in the embodiment.

In the embodiment, the computer readable storage medium includes flash memory, hard disk, multimedia card, card type memory (such as SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk and so on. In some embodiments, the computer-readable storage medium may be an internal storage module of the computing device such as a hard disk or memory of the computing device. In other embodiments, the memory may also be an external storage device of the computing device, such as a plugged hard disk provided in the computer device, a smart media card (SMC), secure digital (SD) card, a flash memory card, and so on. Of course, the computer readable storage medium may also include both an internal storage module and an external storage device of the computing device. In the embodiment, the computer-readable storage medium is generally used to store an operating system and various types of application software installed in the computing device such as program codes of the vibration control method for a computer device and the like. In addition, the memory may also be used to temporarily store various types of data that have been or will be outputted.

It should be noted that in this application, "vibration" refers to generating physical movement of tactile sensation.

Apparently, it should be appreciated by those skilled in the art that each module or step described in the embodiment of the present application can be realized by a general-purpose and that the modules or steps may be integrated on a single computer device or distributed on a network consisting of a plurality of computing devices, optionally, the modules or steps may be realized by executable program codes so that the modules or steps can be stored in a storage device to be executed by a computer device, and in some cases, the steps shown or described herein can be executed in a sequence different from this presented herein, or the modules or steps are formed into integrated circuit modules, or several of the modules or steps are formed into integrated circuit modules. Therefore, the embodiment of the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method for controlling vibrations of a computing device, comprising:
    obtaining a target audio file of a multimedia file;
    dividing the target audio file into a plurality of audio segments;
    determining a target audio segment among the plurality of audio segments based on detecting at least one feature associated with each of the plurality of audio segments, wherein the determining a target audio segment among the plurality of audio segments based on detecting at least one feature associated with each of the plurality of audio segments further comprises:
        determining an audio type of each of the plurality of audio segments, wherein the audio type comprises a music audio type or a game audio type, and
        determining the target audio segment based on a predetermined rule corresponding to the audio type;
    determining a target time period in a total time period of playing the multimedia file, the target time period corresponding to a playback of the target audio segment in the multimedia file;
    monitoring a current time point of playing the multimedia file; and
    controlling a vibration element in the computing device to perform a vibration operation when the current time point of playing the multimedia file is within the target time period.

2. The method of claim 1, wherein the obtaining a target audio file of the multimedia file further comprises:
    extracting an initial audio file of the multimedia file;
    determining a noise signal and a non-noise signal in the initial audio file based on content of the multimedia file; and
    separating the noise signal and the non-noise signal in the initial audio file to obtain the target audio file corresponding to the non-noise signal.

3. The method of claim 1, wherein the determining a target audio segment among the plurality of audio segments based on detecting at least one feature associated with the each of the plurality of audio segments further comprises:
    determining whether each of the plurality of audio segments comprises an abrupt change of the at least one feature.

4. The method of claim 3, wherein the determining whether each of the plurality of audio segments comprises an abrupt change of the at least one feature further comprises:
    determining whether a change of an energy exceeds a first threshold;
    determining whether a change of a pitch exceeds a second threshold; and
    determining whether a change of a timbre exceeds a third threshold.

5. The method of claim 1, wherein the determining a target audio segment among the plurality of audio segments based on detecting at least one feature associated with each of the plurality of audio segments further comprises:
    obtaining at least one parameter indicating the at least one feature associated with each of the plurality of audio segments;
    inputting the at least one parameter to a trained deep neural network model; and
    determining the target audio segment among the plurality of audio segments based on an output result of the deep neural network model.

6. The method of claim 1, further comprising:
    detecting an audio power of each of the plurality of audio segments; and
    controlling the vibration element in the computing device to perform the vibration operation based on the audio power of each of the plurality of audio segments.

7. A system, comprising:
    at least one processor; and
    at least one memory communicatively coupled to the at least one processor and storing instructions that upon execution by the at least one processor cause the system to perform operations comprising:
    obtaining a target audio file of a multimedia file;
    dividing the target audio file into a plurality of audio segments;
    determining a target audio segment among the plurality of audio segments based on detecting at least one feature associated with each of the plurality of audio segments, wherein the determining a target audio segment among the plurality of audio segments based on detecting at least one feature associated with each of the plurality of audio segments further comprises:
        determining an audio type of each of the plurality of audio segments, wherein the audio type comprises a music audio type or a game audio type, and
        determining the target audio segment based on a predetermined rule corresponding to the audio type;
    determining a target time period in a total time period of playing the multimedia file, the target time period corresponding to a playback of the target audio segment in the multimedia file;
    monitoring a current time point of playing the multimedia file; and
    controlling a vibration element in the computing device to perform a vibration operation when the current time point of playing the multimedia file is within the target time period.

8. The system of claim 7, wherein the obtaining a target audio file of the multimedia file further comprises:
    extracting an initial audio file of the multimedia file;
    determining a noise signal and a non-noise signal in the initial audio file based on content of the multimedia file; and
    separating the noise signal and the non-noise signal in the initial audio file to obtain the target audio file corresponding to the non-noise signal.

9. The system of claim 7, wherein the determining a target audio segment among the plurality of audio segments based on detecting at least one feature associated with the each of the plurality of audio segments further comprises:
    determining whether each of the plurality of audio segments comprises an abrupt change of the at least one feature.

10. The system of claim 9, wherein the determining whether each of the plurality of audio segments comprises an abrupt change of the at least one feature further comprises:
   determining whether a change of an energy exceeds a first threshold;
   determining whether a change of a pitch exceeds a second threshold; and
   determining whether a change of a timbre exceeds a third threshold.

11. The system of claim 7, wherein the determining a target audio segment among the plurality of audio segments based on detecting at least one feature associated with each of the plurality of audio segments further comprises:
   obtaining at least one parameter indicating the at least one feature associated with each of the plurality of audio segments;
   inputting the at least one parameter to a trained deep neural network model; and
   determining the target audio segment among the plurality of audio segments based on an output result of the deep neural network model.

12. The system of claim 7, the operations further comprising:
   detecting an audio power of each of the plurality of audio segments; and
   controlling the vibration element in the computing device to perform the vibration operation based on the audio power of each of the plurality of audio segments.

13. A non-transitory computer-readable storage medium, storing computer-readable instructions that upon execution by a processor cause the processor to implement operations comprising:
   obtaining a target audio file of a multimedia file;
   dividing the target audio file into a plurality of audio segments;
   determining a target audio segment among the plurality of audio segments based on detecting at least one feature associated with each of the plurality of audio segments, wherein the determining a target audio segment among the plurality of audio segments based on detecting at least one feature associated with each of the plurality of audio segments further comprises:
      determining an audio type of each of the plurality of audio segments, wherein the audio type comprises a music audio type or a game audio type, and
      determining the target audio segment based on a predetermined rule corresponding to the audio type;
   determining a target time period in a total time period of playing the multimedia file, the target time period corresponding to a playback of the target audio segment in the multimedia file;
   monitoring a current time point of playing the multimedia file; and
   controlling a vibration element in the computing device to perform a vibration operation when the current time point of playing the multimedia file is within the target time period.

14. The non-transitory computer-readable storage medium of claim 13, wherein the determining a target audio segment among the plurality of audio segments based on detecting at least one feature associated with the each of the plurality of audio segments further comprises:
   determining whether each of the plurality of audio segments comprises an abrupt change of the at least one feature.

15. The non-transitory computer-readable storage medium of claim 13, wherein the determining a target audio segment among the plurality of audio segments based on detecting at least one feature associated with each of the plurality of audio segments further comprises:
   obtaining at least one parameter indicating the at least one feature associated with each of the plurality of audio segments;
   inputting the at least one parameter to a trained deep neural network model; and
   determining the target audio segment among the plurality of audio segments based on an output result of the deep neural network model.

* * * * *